United States Patent
Sabot (10) Patent No.: US 7,263,367 B1
(45) Date of Patent: Aug. 28, 2007

(54) SYSTEMS AND METHODS FOR SETTING A MODE OF OPERATION OF ELECTRONIC DEVICES

(75) Inventor: Gary Wayne Sabot, Weston, MA (US)

(73) Assignee: Sabot Associates, Inc., Weston, MA (US)

( * ) Notice: Subject to any disclaimer, the term of this patent is extended or adjusted under 35 U.S.C. 154(b) by 0 days.

(21) Appl. No.: 09/564,369

(22) Filed: Apr. 28, 2000

Related U.S. Application Data (60) Provisional application No. 60/131,867, filed on Apr. 28, 1999.

(51) Int. Cl.
*H04Q 7/20* (2006.01)

(52) U.S. Cl. ............... 455/456.1; 455/565; 455/556.1

(58) Field of Classification Search .............. 455/1, 455/63, 456, 517, 422, 67.3, 414, 415, 436, 455/411, 456.3, 565, 41.2
See application file for complete search history.

(56) References Cited

U.S. PATENT DOCUMENTS

| | | | | |
|---|---|---|---|---|
| 4,554,668 A | * | 11/1985 | Deman et al. | 375/133 |
| 5,001,771 A | * | 3/1991 | New | 342/14 |
| 5,442,805 A | * | 8/1995 | Sagers et al. | 455/456 |
| 5,778,304 A | * | 7/1998 | Grube et al. | 455/456.4 |
| 5,790,962 A | * | 8/1998 | Grube et al. | 455/514 |
| 6,002,938 A | * | 12/1999 | Carnall | 455/463 |
| 6,011,973 A | * | 1/2000 | Valentine et al. | 342/357.07 |
| 6,122,486 A | * | 9/2000 | Tanaka et al. | 455/68 |
| 6,131,045 A | * | 10/2000 | Iwata | 340/7.39 |
| 6,212,390 B1 | * | 4/2001 | Rune | 455/456 |
| 6,230,017 B1 | * | 5/2001 | Andersson et al. | 455/456 |
| 6,246,891 B1 | * | 6/2001 | Isberg et al. | 455/574 |
| 6,256,503 B1 | * | 7/2001 | Stephens | 455/414 |
| 6,331,825 B1 | * | 12/2001 | Ladner et al. | 340/988 |
| 6,356,762 B1 | * | 3/2002 | Guenther | 455/456.4 |
| 6,405,033 B1 | * | 6/2002 | Kennedy et al. | 455/404 |
| 6,405,034 B1 | * | 6/2002 | Tijerino | 455/412 |
| 6,421,544 B1 | * | 7/2002 | Sawada | 455/565 |
| 6,438,375 B1 | * | 8/2002 | Muller | 455/435.3 |
| 6,490,455 B1 | * | 12/2002 | Park et al. | 455/456.4 |
| 6,597,906 B1 | * | 7/2003 | Van Leeuwen et al. | 455/436 |
| 6,615,048 B1 | * | 9/2003 | Hayashi | 455/456.3 |
| 6,625,442 B1 | * | 9/2003 | Kojima | 455/414.1 |

FOREIGN PATENT DOCUMENTS

| | | | |
|---|---|---|---|
| EP | 0 876 071 | | 4/1998 |
| FI | WO97/29607 | * | 8/1997 |
| NL | EP 0881851 A1 | * | 12/1998 |
| SE | EP 000881851 A1 | * | 5/1997 |
| SE | EP 0881851 A1 | * | 5/1997 |
| SE | EP000881851 A1 | * | 2/1998 |
| WO | WO98/25433 | | 6/1998 |
| WO | WO99/55102 A1 | * | 10/1999 |

\* cited by examiner

*Primary Examiner*—Matthew Anderson
*Assistant Examiner*—Tan Trinh
(74) *Attorney, Agent, or Firm*—Foley Hoag LLP

(57) ABSTRACT

Systems and methods are presented to regulate the usage of electronic devices when the device is located within a predetermined region of space. The sound or light emitted from, or range of motion of the electronic device, for example, may be regulated in the predetermined region of space.

10 Claims, 5 Drawing Sheets

SYSTEMS AND METHODS FOR SETTING A MODE OF OPERATION OF ELECTRONIC DEVICES

CROSS-REFERENCE TO RELATED APPLICATIONS

This application claims priority to U.S. Provisional Application No. 60/131,867 filed Apr. 28, 1999, which is hereby incorporated by reference.

FIELD OF THE INVENTION

This application relates to the field of operation of electronic devices, and more particularly to regulating usage of such devices in accordance with a policy dictating how the devices may operate in a predetermined region of space.

BACKGROUND OF THE INVENTION

As the use of electronic devices has proliferated, there has arisen situations where usage of the electronic devices has become a nuisance. Cell phones, for example, annoyingly ring during theater performances, or in classrooms. Laptop computers, with their noisy keyboards and sounds may also cause a disturbance. Furthermore, loud music players of all types have prompted city officials to introduce bylaws to prohibit the playing of these devices in subway trains, for example, without the use of a headset. As the average commuter may attest, however, these bylaws may not always be complied. If such bylaws are not obeyed, even less so may be a posting, for example, at the entrance of a theater requesting that cell phones be turned off. Requests of this kind have their limitations. Some persons will not read postings of policies dealing with the use of electronic devices. Others, will simply not comply with the requests, intentionally or inadvertently.

An establishment, such as a theater or school, wishing to curtail the use of electronic devices has few viable options. Jamming of electronic devices may be expensive or prohibited by law. Threats of confiscation of the electronic devices if used within the establishment raise many difficult issues such as the practicability of enforcing such a policy, and the hassles that would accompany such a policy when, for example, an establishment attempts to confiscate an expensive electronic device.

Therefore, there exists a need for effective systems and methods that regulate the usage of an electronic device in designated locations in accordance with a policy.

SUMMARY OF THE INVENTION

The systems and methods described herein address the need for effective systems and methods that regulate the use of electronic devices, such as portable communications devices, in accordance with a usage policy. The policy may set forth an acceptable mode of operation of the electronic devices in a predetermined region of space, as established by individuals, or organizations wishing to control the use of the electronic devices. For example, an owner of a theater may want to restrict the use of cell phones by audience members during a performance. The owner may then want to establish a policy outlining the details of the restriction of these cell phones. In this example, the policy may provide details such as whether to permit ringing of cell phones, and, if permitted, the maximum volume at which cell phones may ring. Other details of the policy may include the date and time at which the cell phone may be regulated, and the location where the cell phone may be regulated (e.g., the theater hall alone, or the foyer and the hall).

In accordance with one embodiment of the invention, a system for defining a mode of operation of a device when the device is within a predetermined region of space is provided herein. The system may include a locator for identifying a position of the device. In one embodiment, the locator of the system may include a global positioning system receiver for determining the position of the device. The locator may also employ triangulation, and/or location fingerprinting to determine the position of the device. The system may also include a restrictor for regulating the mode of operation of the device when the position of the device is within the predetermined region of space. The system may further include a conveyor to permit the locator to communicate to the restrictor the position of the device. A database may also be provided for storing instructions for setting forth the mode of operation of the device.

In one embodiment, the restrictor of the present invention may regulate, for example, the frequencies of sound, the volume of sound, the frequencies of light, and/or the intensity of light that may be emitted from, or input to the device, when the device is in the predetermined region of space. For example, a restrictor may disable the microphone of a cell phone to prevent a person in a predetermined region of space from talking with another person over the phone. The restrictor may also regulate the range of motion of the device when the device is in such a region of space. For example, children's toys, such as a remote control car, may be regulated in their range of motion, in accordance with the established policy. Another example of the regulation of the range of motion of devices includes cell phones and pagers whose vibration may be regulated in the predetermined region of space.

As disclosed above, in one embodiment, the electronic device can be a cell phone that may be regulated with the use of a restrictor. The restrictor may either be integrated into the cell phone, in which case the restrictor and cell phone may be enclosed by a common housing, or spatially positioned away from the cell phone. An example of the latter, where the restrictor may be spatially positioned away from the cell phone, occurs when adapting older phones, which do not come equipped with restrictors, for use in accordance with an embodiment of the present invention. To regulate such older cell phones, or other phones not equipped with restrictors, a cell site typically used in connection with cellular phones, may be used. In addition, if the cell phone does not come equipped with a locator, the cell phone may emit an electromagnetic field having a signal strength, such that a locator positioned away from the phone may utilize the signal strength for identifying the position of the device.

In either the case where the phone is equipped with a restrictor, or the other case where it does not, a system for defining a mode of operation of the phone may include a conveyor having a transmitter to transmit information associated with the position of the phone. The information transmitted may be in the form of electromagnetic radiation. To receive this radiation, the cell cite may include a receiver of the radiation, and a transmitter of an electromagnetic field. The field may be modified to regulate the cell phone when the position of the cell phone is in the predetermined region of space.

BRIEF DESCRIPTION OF DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

To provide an overall understanding of the invention, certain methods, and systems will be discussed with reference to defining a mode of operation of cell phones in regions of space in accordance with a policy set forth by an individual, or group of individuals. However, it will be understood by persons of ordinary skill in the art that the methods, and systems described herein may be modified while still remaining within the scope of the invention. In particular, in addition to phones, other electronic devices from which may emanate light or sound, or which may draw attention to itself by motion, or that requires sound or light to operate, may be regulated in accordance with principles of the present invention.

To curtail unwanted noises or lights, in accordance with a usage policy for a predetermined region of space, it may be desirable to regulate electronic devices, such as laptop computers and cell phones, when these devices are within the predetermined region of space. The policy may include a set of regulations, or codes that prescribe how electronic devices may operate. The policy may refer to these regulations in the abstract, as conceived by a human, or may refer to a computer code, which, for example, when read by a processor, may be implemented by electronic means to regulate the mode of operation of a device. A policy may be part of a method of doing business which proscribes certain modes of operation of electronic devices used by customers of a business. For example, a theater owner may institute a policy limiting the use of cell phones by audience members watching a performance. The instituted policy may either proscribe such cell phones from ringing, or at least limit the volume of the ringing. The policy may also restrict various inputs to the device. To implement such a policy, a restrictor may be provided so as to disable, for instance, the microphone of a cell phone to prevent a person in a predetermined region of space from talking with another person over the phone. (Although prevented from talking, the policy may nonetheless still allow the person to listen to messages.) In one embodiment, the microphone is disabled only if the volume of the voice reaching the microphone is greater than a certain level. This might discourage persons from talking too loudly into a cell phone.

When the electronic device is in the predetermined region of space, the user of the device may be required by the policy to perform some action, or conform to some standard, if the device is to operate. For example, upon entering a theater, a cell phone user may be required to fill out a questionnaire before the cell phone is permitted to operate. When the questionnaire is completed, a representative of the theater, such as the theater owner, may send a signal (perhaps by calling a telephone number and entering an identification code) to the user's cell phone company to indicate that it is permissible for the cell phone to operate within the theater. If the user refuses to fill out the questionnaire, the representative could choose to not send the signal that enables the cell phone. In a different example, the business owner might insist that the cell phone possess an apparatus to enable the location of the cell phone to be determined within some predetermined accuracy. Thus, for the cell phone to operate in a predetermined region of space, such as a theater, the cell phone might be required to possess a global positioning system that provides the position of the phone to within a resolution of a theater seat length. This may allow the theater owner to monitor which seats are occupied during a performance.

The policy may be mandated not only by an individual, such as a theater owner, but also by groups of individuals, or institutions. For example, government officials in compliance with laws of a city, state/province, or country may desire to regulate electronic devices, such as when federal law prohibits the use of unauthorized communication devices in sensitive regions for national security reasons. A policy may dictate various terms of the regulation of the electronic devices. The policy may also be dynamic resulting in regulations of the electronic device that change over time. Furthermore, the predetermined region of space in which the policy is enforced need not be predetermined in the sense that the region may be predefined, or predicted a priori. Instead, a predetermined region may include a region which, although incapable of being predefined, is specified by a deterministic algorithm. For example, the specification of a region of space may involve an algorithm based on the behavior of theater patrons, such as "if more than fifty persons attend a performance, then the region of space includes the theater foyer, otherwise it does not."

Figure 1:
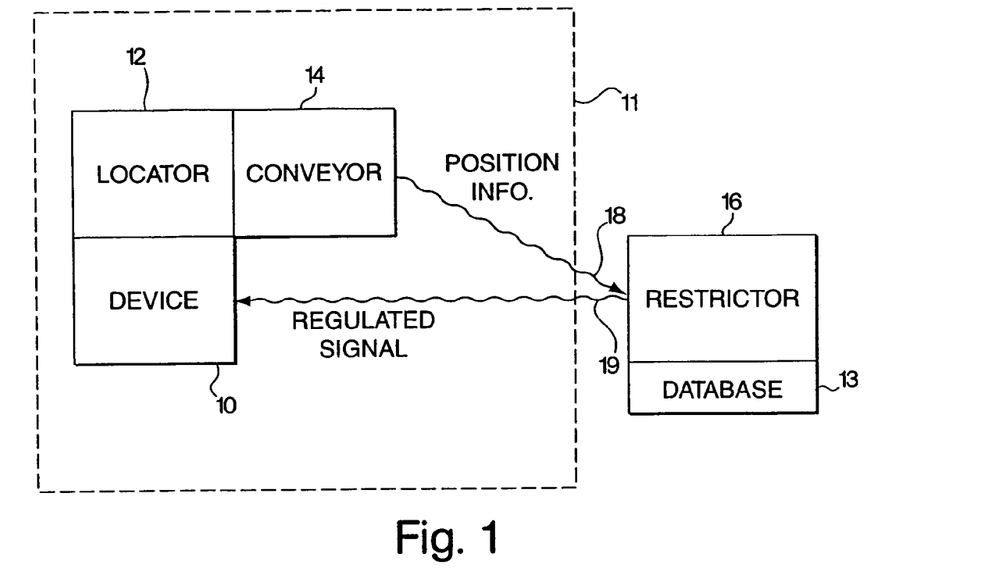
FIG. 1 illustrates a system for regulating usage of an electronic device in accordance with an embodiment of the present invention.

Referring now to FIG. 1, a system is illustrated for defining a mode of operation of an electronic device in accordance with an embodiment of the present invention. The electronic device 10 may be any electronic object, such as that which emits sound or light, or which may draw attention to itself by motion, or that requires sound or light to operate. Examples include a cell phone, which may both emit sound and require sound (i.e., voice), or a laptop computer. Another example may be a toy that normally may be capable of unfettered motion, such as a remotely operated model car. The device, in one embodiment, may include a locator 12, for identifying a position of the device 10. The device 10 may also include a conveyor 14, for conveying information 18 pertaining to the position of the device 10. The position information 18 may be transmitted by the conveyor 14 to a restrictor 16. The restrictor 16 may regulate the operation of the device 10 when the position of the device 10 is within a predetermined region of space 11. The restrictor 16, in one embodiment, may be governed by a policy setting forth the mode of operation of the device 10. The policy, as provided, may be set forth, for example, by the owner of a region of space 11. To regulate the electronic device 10, a signal 19 may be transmitted from the restrictor 16 to the device 10. The signal 19 may contain information which may be interpreted by the device 10 to help set forth a mode of operation of the device 10 in the region of space 11.

Still referring to FIG. 1, the locator 12 may be any apparatus that helps to determine the position of the electronic device 10. In one embodiment, a global positioning system (GPS) may be used to find such a position. The particular GPS locator 12 that may be used depends on the accuracy required to enforce the policy. If the region of space 11 in which policy regulates use is relatively small, a small restaurant for example, then a more accurate GPS locator 12 may be employed. As known to those in the art, an accuracy of approximately 5-10 meters may be achieved by using a GPS locator 12 with a differential beacon receiver to correct for selective availability. In one embodiment, GARMIN's GBR 21™ GPS locator, a commercially available product, may be adapted by those of ordinary skill in the art in connection with the present invention. If less accuracy is required, or if selective availability is not imposed, the differential beacon receiver may be unnecessary. In such case, GARMIN's GPS 12™ locator, also a commercially available product, may be adapted by those of ordinary skill in the art in connection with the present invention. Server assisted GPS locators may also be used to find the position of the device 10 by placing stationary servers throughout an area of coverage to assist mobile GPS receivers in acquiring signals, as known to those of ordinary skill in the art. SiRF Technologies™, for example, manufactures a postage stamp-sized chipset with built in network assisted DGPS that may be adapted for use in the present invention.

In addition to GPS, other types of locators 12 may be used, so long as they permit determining of the location of the device 10. Examples include locators that utilize signal direction/triangulation (e.g., a locator on the device may receive signals from three fixed remote transmitters, and from the three corresponding signal strengths find the position of the device), signal times of arrival, enhanced signal strength (e.g., the lay of the land, obstructions, and multipath reflection problems, together with the signal strength of several base stations may be used to determine a position of the device), and location fingerprinting (e.g., an area with the problems may be surveyed, and the characteristics of relevant points are mapped; devices may then receive distorted signals whose distortions help identify a position, as occurs with the commercially available product, RadioCamera™ of U.S. Wireless Corp.) as described, for example, in H. Koshima and J. Hoshen, *Personal locator services emerge*, IEEE Spectrum 37, 41 (2000), which is incorporated by reference.

Once the position of the electronic device 10 has been determined using the locator 12, a conveyor 14 may be utilized to transmit the position information 18 to the restrictor 16. In one embodiment of the invention, the locator 12 and the restrictor 16 may be connected by electronic circuitry, and both positioned on the device 10. In such an embodiment, the conveyor 14 may include computer instructions and/or a processor for transferring the position information 18 from the locator 12 to a computer memory included in the restrictor 16. In another embodiment, the locator 12 may be positioned away from the restrictor 16, so that, for example, the distance between them may be on the order of a mile. In such an embodiment, the conveyor 14 may include a transmitter of electromagnetic radiation, and may transmit the position information 18 to a receiver (not shown) in the restrictor 16. In a further embodiment, the locator 12 and restrictor 16 may be connected by communication cables, for instance, such as those that link the Internet. In such an embodiment, the conveyor 14 may include the cables, routers and links to convey information from the locator 12 to the restrictor 16 by methods known to those of ordinary skill in the art.

The restrictor 16, in one embodiment, may include a processor for accessing a database 13 in which may be stored the policy or instructions associated with the mode of operation of the device. The instructions stored in the database 13 may be used for regulating the usage of the electronic device. Furthermore, the restrictor 16, by using a processor or by other means known to those of ordinary skill in the art, may determine whether the position of the device 10, as conveyed by the conveyor 14 to the restrictor 16, lies within the region of space 11. If the position lies within the region of space 11, the restrictor 16 may then take further action to regulate the device 10. The type of restrictor 16 that may be utilized depends on the type of electronic device whose usage is being regulated according to principles of the present invention.

Figure 2:
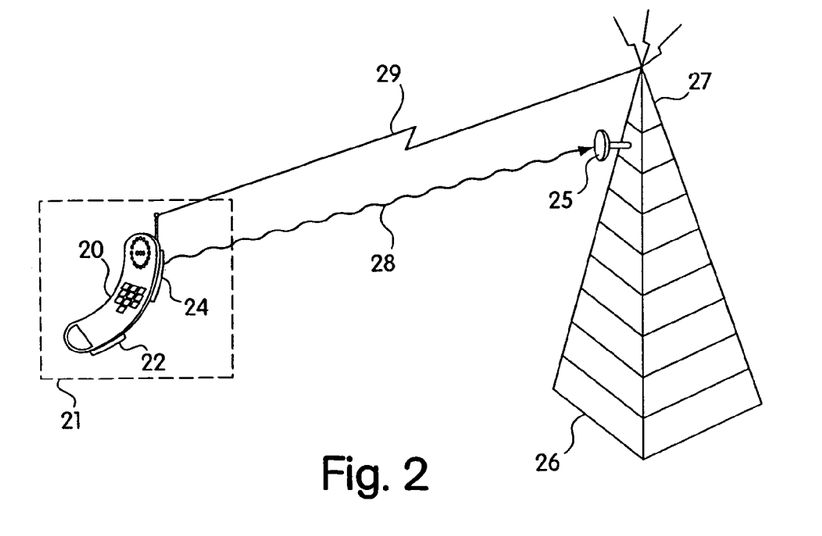
FIG. 2 depicts a system for regulating the usage of a cell phone in accordance with an embodiment of the present invention.

Referring now to FIG. 2, a system is shown for defining a mode of operation of a cell phone 20. The system includes a cell site 26, which may regulate the phone 20 when the position of the phone 20 lies within the predetermined region of space 21, as prescribed by a policy. To determine the location of the cell phone 20, a locator 22, such as a GPS locator, described above, may be used. Once the locator 22 determines the position of the cell phone 20, a transmitter of radiation 24 may be used to transmit the position information 28 to the cell cite 26 via electromagnetic radiation. The cell cite 26 may include a receiver 25 for receiving the position information 28 via the electromagnetic radiation. In addition, the cell site 26 may include a transmitter of an electromagnetic field 27 to help regulate the cell phone 20.

To interpret the position information 28, and to regulate the operation of the cell phone 20 in a manner consistent with a policy, the cell site 26 may include a database (not shown) for storing the instructions associated with the policy, and a processor (not shown) that may be used to process the position information 28, and the instructions. The instructions, which may be written in computer code, associated with the policy may provide details of how (ringing characteristics, volume, etc.), and when (dates, and time, for example) the phone may operate within the region 21. After the processor reads the instructions, the processor may instruct the cell site 26 to transmit a signal 29, which may be an electromagnetic field, to the cell phone 20 to regulate its mode of operation in a manner that is consistent with the policy governing usage of the cell phone 20. To transmit the signal, the transmitter of an electromagnetic field 27 may be employed.

The type of signal 29 may be dictated by the instructions associated with the policy stored in the database (not shown) included in the cell cite 26. For example, the policy may prevent the transmission of an electromagnetic signal from the cell cite 26 to the cell phone 20 that corresponds to non-emergency calls to the cell phone 20. Thus, the policy may allow only certain calls to be placed to the cell phone 20 from telephone operators that deal with emergencies. For example, if person A is trying to reach person B in an emergency while person B's cell phone 20 is inside the region of space 21, person A may first have to contact a telephone operator to place the call. The policy may allow all telephone calls to go through if they originate from such an operator, even if the cell phone 20 lies in the region of space 21.

The database storing instructions to regulate usage of the device 10, and the processor for processing those instructions and the position information 28, need not be located near the transmitter 27. For example, in one embodiment, the database and processor may be located near a database associated with a home location register, which can be a database connected to several cell sites, and which can contain a phone subscriber's profile.

Figure 3:
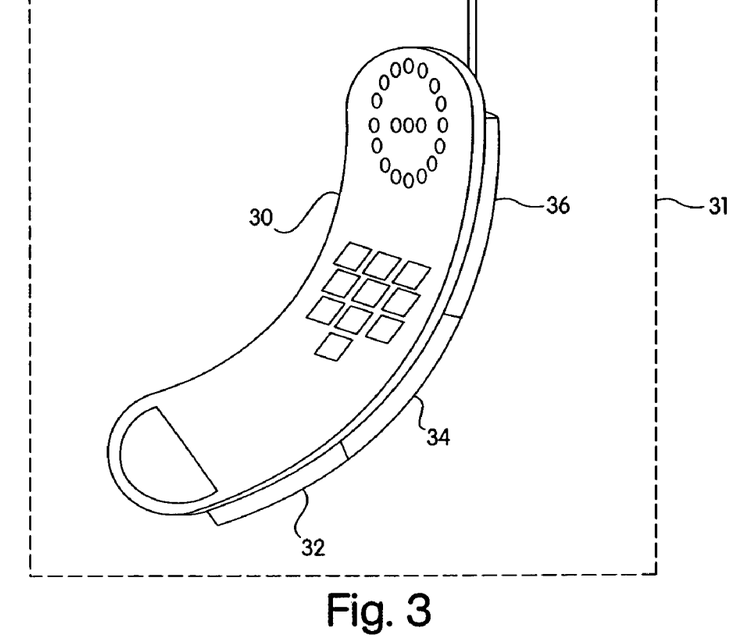
FIG. 3 depicts an embodiment of the present invention in which a restrictor, for regulating an electronic device, is attached to a cell phone.

Referring now to FIG. 3, there is shown a cell phone 30 which includes a restrictor 36 thereon. The cell phone 30 may further include a locator 32, which may be a GPS locator, as described above. To permit information on the position of the cell phone 30 to be transmitted from the locator 32 to the restrictor 36, the cell phone 30 is provided with a conveyor 34. The conveyor 34 may include a processor (not shown) together with instructions to input the position from the locator 32 and convey it to the restrictor 34. If the cell phone 30 is located inside a region of space 31 defined by policy, the restrictor 36 may regulate the operation of the cell phone 30. In one embodiment, the restrictor 36 may include a processor and a database in which pertinent details of the policy may be stored. For example, the policy may prescribe that the volume of the ringer of the cell phone 30 be lower than a particular level when the cell phone 30 is located in a particular region of space 31. In another example, the ringer of the cell phone 30 may be prevented from operating, according to the established policy.

It should be appreciated that although a cell phone has been described in connection with one embodiment of the invention, other electronic devices may also be adapted for use in accordance with the principles of the present invention. In one embodiment, for example, the electronic device may be a laptop computer. In such a case, the policy may be provided to reduce the volume of sound emanating from the computer, or the intensity of light emanating from the computer screen.

Figure 4:
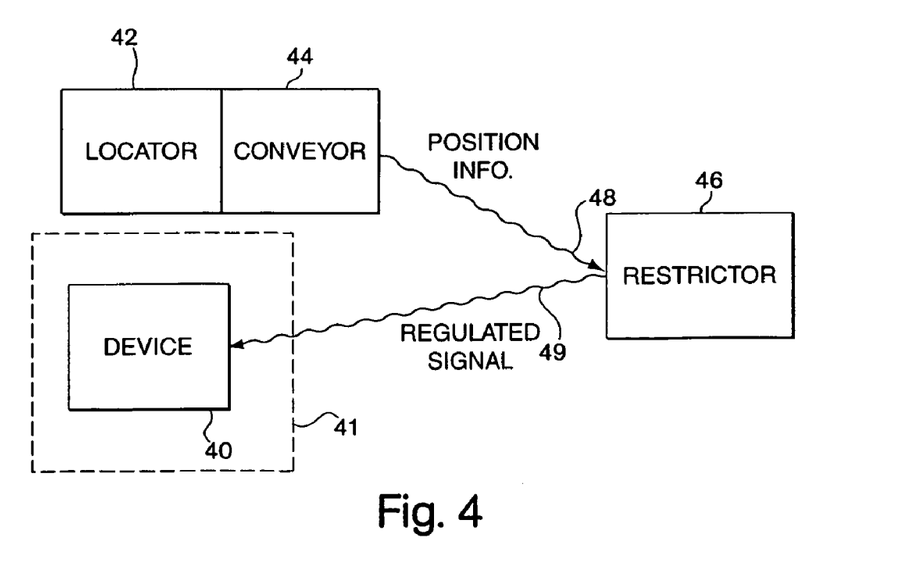
FIG. 4 illustrates a system for regulating usage of an electronic device in accordance with another embodiment of the present invention.

Referring now to FIG. 4, there is shown, in accordance with an embodiment of the present invention, an electronic device 40 which may not be equipped with a locator, a conveyor, and/or a restrictor of the present invention. Such a device may be an older electronic device that may not have special equipment to regulate usage but which may, nonetheless, be subject to principles of the present invention. To adapt the device 40 for use in accordance with an embodiment of the present invention, a locator 42 may be provided to ascertain the location of the device 40. The locator 42, not necessarily on the device 40, may be used to measure characteristics of electromagnetic waves emitted from the device 40. Generally, the device 40 will emit electromagnetic radiation with characteristics that may be measured by the locator 42 to determine the position of the device 40. The conveyor 44 may also be provided to permit the position of the device 40 to be communicated to a restrictor 46. The restrictor 46, accordingly, may be designed to receive the position information 48 from the conveyor 44. The restrictor 46 may be governed by an established policy, for a defined region of space 41, in which a usage of the electronic device 40 is regulated. A signal 49 may be transmitted to the electronic device 40 resulting in regulated usage in the region of space 41, as described above.

Figure 5:
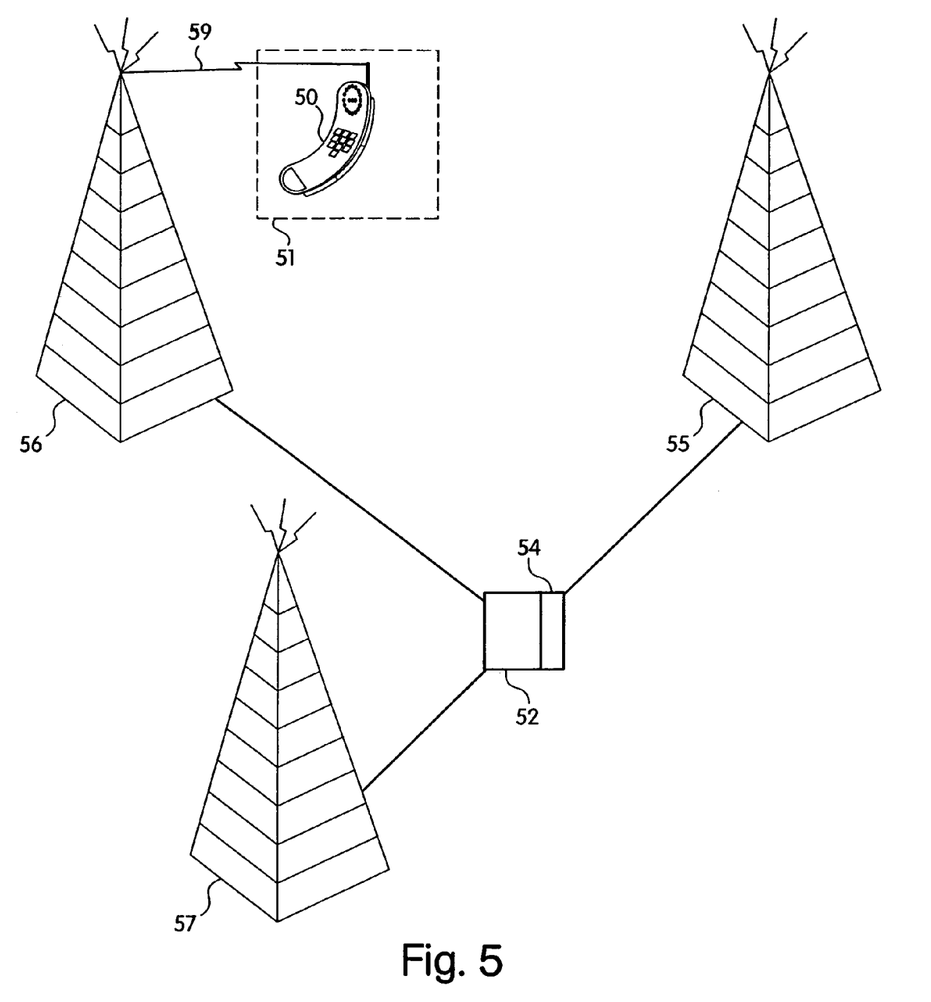
FIG. 5 depicts an embodiment of the system illustrated in FIG. 4 in which the electronic device is a cell phone.

Referring now to FIG. 5, an embodiment of the system illustrated in FIG. 4 is shown in which the electronic device 40 is a cell phone 50. The cell phone 50 may be an older device that may not have special equipment to regulate usage but which may, nonetheless, be subject to principles of the present invention. In an embodiment, a locator 52 may be provided to determine the position of the cell phone 50 using, for instance, triangulation. Specifically, when the cell phone 50 is turned on, it may send a data message, containing identification information, to cell sites 56-58. The signal strength of the data message may be recorded by each of the cell sites 56-58, and passed to a locator 52. The locator 52 may then use the signal strengths from the cell sites 56-58, and the principle of triangulation to compute the position of the cell phone 50. A conveyor 54 may then convey the position information to the cell cite with the strongest signal strength, or that is closest to the cell phone 50, for instance cell site 56. If the position of the cell phone 50 is inside the region of space 51, cell site 56 may modify the radiation that it emits to the cell phone 50 to regulate the usage. For example, the cell site 56 may permit a phone call to last only a certain length of time as may be dictated by the policy, or may prohibit the sending or reception of any regular phone calls. Emergency telephone calls to the cell phone 50, however, may be allowed as discussed above.

Older equipment, such as an older cell phone, that does not include equipment for regulating its use according to policy may nonetheless be regulated using several methods and systems. For example, some or all of the communication and signaling information may be moved out-of-band where older equipment cannot receive it. The movement to out-of-band may be keyed to the older equipment's location, as detected by the cell equipment.

Figure 6:
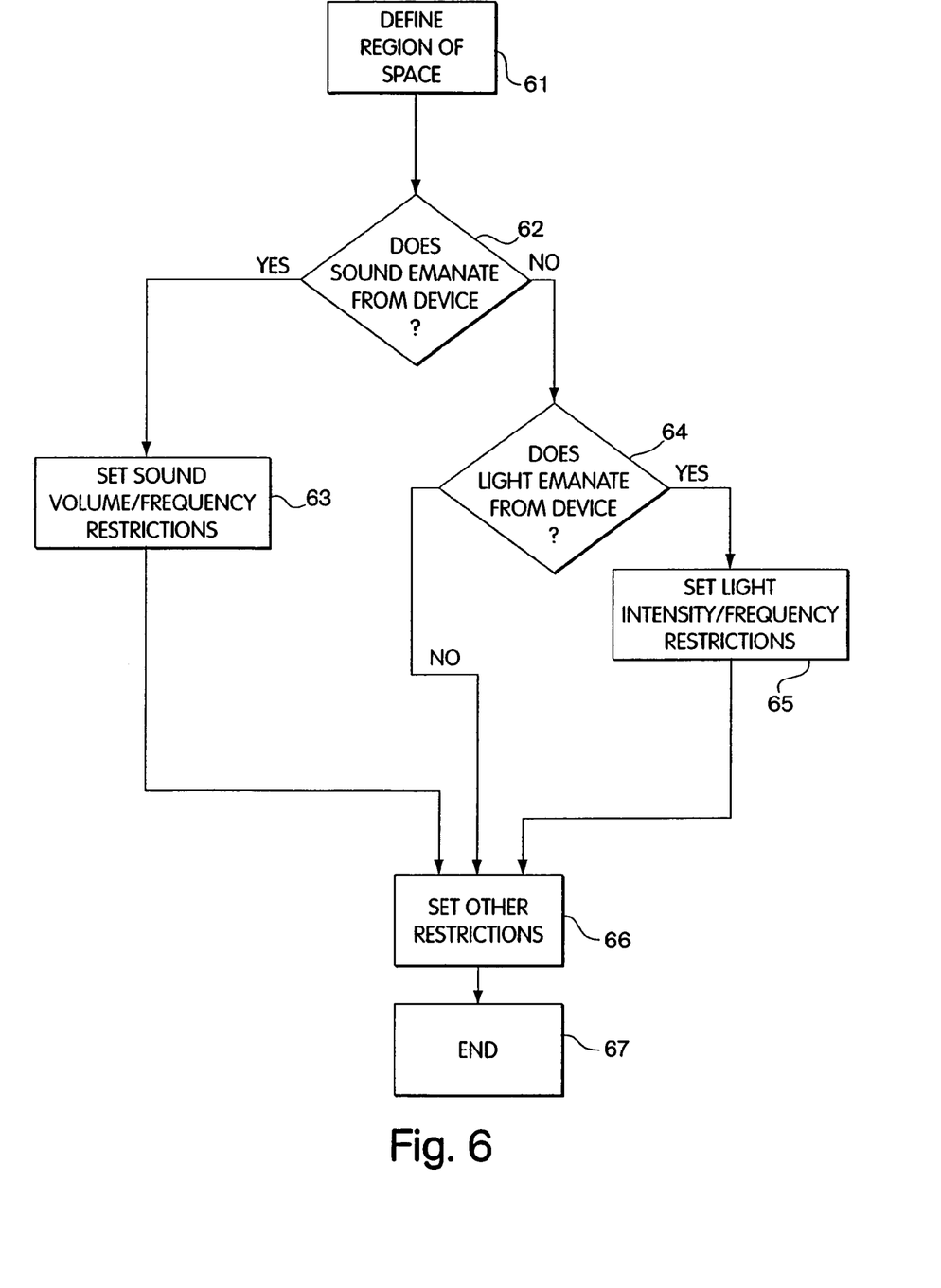
FIG. 6 shows a flowchart indicating the steps involved in setting a policy for regulating the usage of an electronic device according to one embodiment of the present invention.

Referring now to FIG. 6, a flowchart is provided illustrating the steps that may be involved in setting a policy for regulating usage of a device according to one embodiment of the present invention. To set the policy in one embodiment, data may be input to a database and processed using a processor included in the restrictor 16. In step 61, the region of space in which the usage of the electronic device is to be regulated is specified. As an example, in step 62, a branch in the flow occurs depending on whether the electronic device emits sound. If sound is emitted, in step 63, the frequency and volume of the sound that may be emitted from the electronic device may be stipulated, and the flow is then transferred to step 66. If no sound is emitted, then step 64 is taken where another branch in the flow occurs depending on whether the electronic device emits light. If light is emitted, in step 65, the frequency and volume of the light that may be emitted from the electronic device may be stipulated, and the flow is then transferred to step 66. If no light is emitted, in step 66, other stipulations of the policy may be provided, before the flow stops at step 67.

Figure 7:
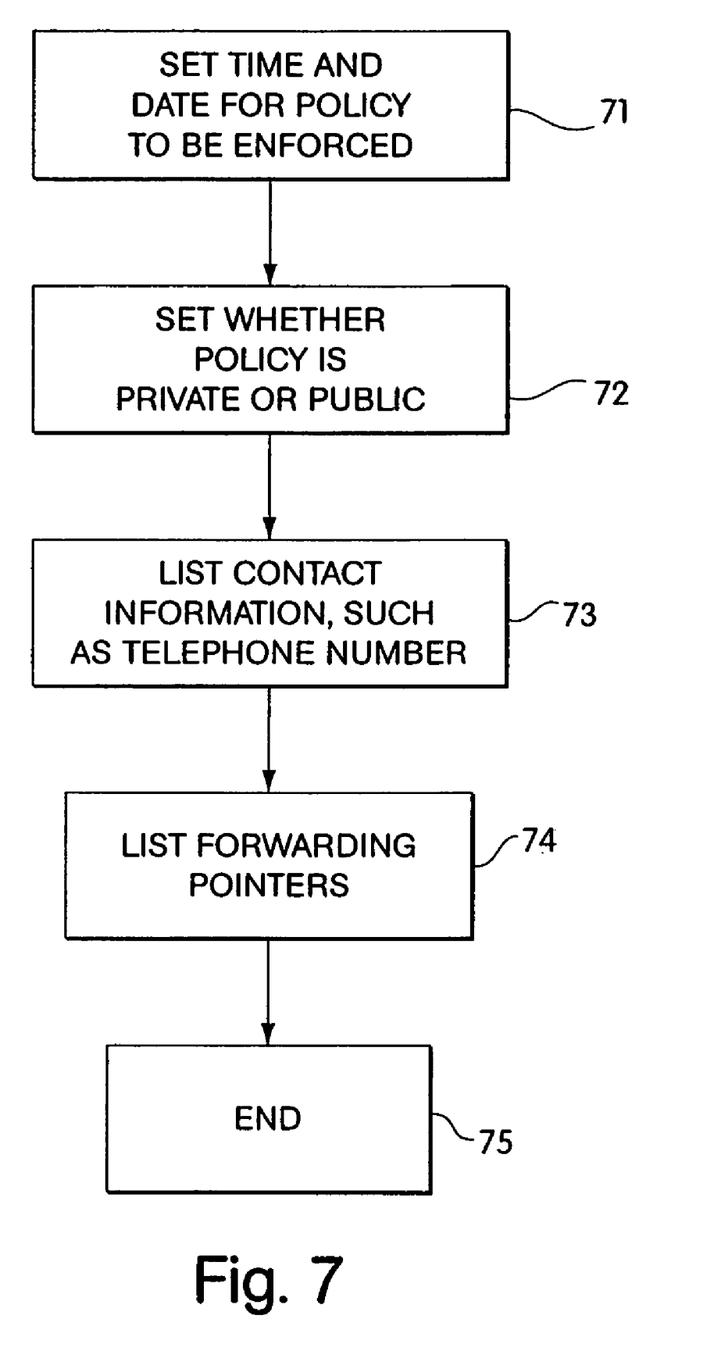
FIG. 7 shows a flowchart indicating more details involved in setting a policy for regulating the usage of an electronic device according to one embodiment of the present invention.

Referring to FIG. 7, a flowchart is provided illustrating the details involved in step 66 for specifying additional modes of operation for the device 10 according to one embodiment of the present invention. For example, in step 71, the time and date during which the usage of the electronic device is to be regulated may be specified. The date and time may be input manually using a processor coupled to the restrictor 16. As an alternative, the policy may also be set automatically in response to various conditions. For example, in one embodiment, one may regulate the device every Wednesday night. The regulations in accordance with the established policy may then be enforced automatically every Wednesday night. In another embodiment, a processor included in the restrictor 16 may access a database having information that may help trigger the enforcement of policy. For example, the database may include daily temperatures, and a policy to regulate usage of the electronic device 10 may become effective automatically if the temperature rises above some specified value. The information in the database accessed by the restrictor 16 may be provided in many ways. In one embodiment, the database may be connected to the Internet, which may then be the source of information that may help trigger the enforcement of policy. Alternatively, the database may be updated directly by a person, who may be responsible for the enforcement of policy. In step 72, a level of privacy of the policy may also be set. For example, the policy may be made accessible to only one person. In another embodiment, the policy may be stored in a database coupled to the restrictor 16 that is accessible to the public via the Internet. In step 73, a list of contact information may be supplied. For example, a policy may be attached to a free text field that contains information such as emergency phone numbers for reaching an establishment that maintains the policy. Thus, if a policy prohibits the use of cell phones in a region of space 11 that is a restaurant, in step 73 the restaurant's telephone number may be provided in case a patron in the restaurant must be reached. In step 74, forwarding pointers may be provided. Such pointers may include Web pointers to additional information including version numbers for the policy, equipment requirements to establish the policy, and policy hours. Information in a policy may be transmitted directly, or elided in favor of a pointer to the information.

A policy may also be set to regulate the usage of electronic devices in other ways. A policy may, for example, prohibit the audible ringing of a cell phone, allow vibration of phones and pagers, prohibit the use of voice communication (independent of ringing) or of text or video displays, prohibit the use of noisy clacking or beeping from a cell phone or laptop keyboards. It may also define circumstances in which the policy may be overridden, perhaps simply by request after the person desiring to violate the policy reads a bit of text explaining the reason for the policy. The policy may also be overridden in an emergency, or by a policy administrator with override privileges. Outgoing emergency calls to 911 might always be allowed. A policy may define who is authorized to do the overriding, when the overriding may occur, and how long a permission to override exists.

Communication equipment that is compatible with the policy may be required to pass along an authentication token or signal in order to operate. For example, when the electronic device is a cell phone, as part of the registration cycle known to those of ordinary skill in the art, an authentication token may have to be provided. When the cell phone is turned on, it may send a data message to the cell site, including a mobile identification number, an electronic serial number, and the authentication token. Without the authentication token indicating that the electronic device comports with the policy, the electronic device may not operate.

The policy may also include the steps to be taken if an attempted communication is rejected. For example, a person making a telephone call to a cell phone that may not be used because of the established policy may receive information to explain why the cell phone did not accept the call (e.g., "The person you are trying to reach is in a restricted area and may not presently be contacted. If this is an emergency, . . . ), or receive a distinctive tone or signal, for example.

An established policy may also include limitations on length or quantity of communication (phone calls cut off after x seconds, n phone calls or data packets allowed in total, or in a given window of time, etc.)

In one embodiment, the instructions for regulating a device that form part of the policy may be transmitted to a cell phone, for example, by electromagnetic radiation. These instructions, which may detail how the restrictor may regulate the phone, may be transmitted to the phone as the phone leaves or enters the predetermined region of space. In one example, the instructions might allow access to a range of communication frequencies. In another example, the instructions may permit the phone to operate normally when the phone is in the predetermined region of space, but only for a period of time. If the region of space is a theater, for instance, the policy may permit the phone to operate normally during intermission. After that period of time, the phone may send a signal to the cell site to request that further instructions, for setting forth the mode of operation of the phone, be sent from the cell cite to the phone.

In another embodiment, the instructions for regulating the device that form part of the policy may be stored in a database that is accessible by members of the public. For example, members of the public trying to reach a cell phone located within a predetermined region of space may want to access the database to learn about the policy for setting forth a mode of operation of the cell phone. In the situation described above, for example, in which a caller receives the message "The person you are trying to reach is in a restricted area and may not presently be contacted," the caller may be allowed to access a database to obtain more information about the policy, perhaps to find out if there is a time when the call can be made. In one embodiment, the caller may access the database by using the Internet.

While the invention has been disclosed in connection with the preferred embodiments shown and described in detail, various modifications and improvements thereon will become readily apparent to those skilled in the art. For example, although systems and methods have been provided for regulating the usage of cell phones, and portable computers in establishments such as theaters and restaurants, it is understood that the usage of any electronic device may be regulated in any region of space, in accordance with a policy. In addition, although examples have been provided herein in which regulating an electronic device includes restricting the device in some way, the principles of the present invention may also be applied to enhance, or widen the functionality of the electronic device in predetermined regions of space. Accordingly, the spirit and scope of the present invention are to be limited only by the following claims.

I claim:

1. A system for defining a mode of operation of a device, the system comprising:
   a) a locator for identifying a position of the device;
   b) a conveyor to communicate the position of the device; and,
   c) a restrictor mounted on the device, the restrictor having a plurality of policies for operation of the device, each policy associated with one of a plurality of specified regions of space, the restrictor to receive the position and identify the position as being within a particular one of the specified regions of space, and based on the particular one of the specified regions of space and characteristics of the device, select a policy associated with the device to provide a selected policy, and, based on the selected policy, define the mode of operation of the device.

2. A system as in claim 1, further comprising a database for storing instructions associated with the mode of operation of the device, the database having associated entries for the plurality of policies, the plurality of specified regions of space and the characteristics of devices.

3. A system as in claim 1, wherein the restrictor regulates at least two of: a volume of sound, frequencies of sound, intensity of light, frequencies of light emitted from the device, frequencies of light emitted to the device, and range of motion of the device.

4. A system as in claim 1, wherein the locator includes a global positioning system receiver.

5. A system as in claim 1, wherein the locator employs at least one of triangulation and location fingerprinting for identifying the position of the device.

6. A system as in claim 1, wherein the device includes a cell phone.

7. A system as in claim 6, wherein the conveyor includes a transmitter of electromagnetic radiation, said radiation including information associated with the position of the cell phone.

8. A system as in claim 6, wherein the cell phone emits an electromagnetic field having a signal strength capable of being utilized by the locator for identifying the position of the device.

9. A system according to claim 1, where the selected policy changes over time.

10. A system according to claim 1, where the selected policy is associated with at least one of: at least one deterministic algorithm, a time, and a date.

* * * * *